United States Patent
Liu et al.

(10) Patent No.: US 11,696,270 B2
(45) Date of Patent: Jul. 4, 2023

(54) EFFICIENT RESOURCE UNIT ALLOCATION SIGNALING IN EXTREME-HIGH-THROUGHPUT WIRELESS COMMUNICATIONS

(71) Applicant: MediaTek Singapore Pte. Ltd., Singapore (SG)

(72) Inventors: Jianhan Liu, San Jose, CA (US); Shengquan Hu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 88 days.

(21) Appl. No.: 17/347,520

(22) Filed: Jun. 14, 2021

(65) Prior Publication Data
US 2021/0392644 A1   Dec. 16, 2021

Related U.S. Application Data

(60) Provisional application No. 63/039,514, filed on Jun. 16, 2020, provisional application No. 63/040,029, filed on Jun. 17, 2020.

(51) Int. Cl.
*H04W 72/0453*  (2023.01)
*H04W 84/12*    (2009.01)
*H04B 7/0452*   (2017.01)

(52) U.S. Cl.
CPC ...... *H04W 72/0453* (2013.01); *H04B 7/0452* (2013.01); *H04W 84/12* (2013.01)

(58) Field of Classification Search
CPC ................................................. H04W 84/12
USPC ......................................................... 370/329
See application file for complete search history.

(56) References Cited

U.S. PATENT DOCUMENTS

2020/0112408 A1   4/2020   Verma et al.

OTHER PUBLICATIONS

European Patent Office, European Extended Search Report for European Patent Application No. 21179587.7, dated Nov. 9, 2021.
Jianhan Liu, "On RU Signaling in EHT-SIG", IEEE Draft, 11-20-0578-00-00BE-ON-RU-ALLOCATION-SINGLING-IN-EHT-SIG, IEEE-SA Mentor, Piscataway, NJ, USA, vol. 802.11 EHT; 802.11be, Apr. 6, 2020, pp. 1-14, XP068167364.
Myeongjin Kim, "EHT SIG Structure for Multi-user Support", IEEE Draft, 11-20-0829-00-00BE-EHT-SIG-STRUCTURE-FOR-MULTI-USER-SUPPORT, IEEE-SA Mentor, Piscataway, NJ, USA, vol. 802.11 EHT; 802.11be, Jun. 1, 2020, pp. 1-25, XP068168129.

*Primary Examiner* — Angel T Brockman
(74) *Attorney, Agent, or Firm* — Han IP PLLC; Andy M. Han

(57) ABSTRACT

An extreme-high-throughput (EHT) physical-layer protocol data unit (PPDU) is signaled between a first station (STA) and a second STA to indicate a resource unit (RU) allocation with respect to multiple users. One or more RU allocated to the first STA or the second STA as indicated in the EHT PPDU can be determined by using a RU allocation table that includes, in addition to entries corresponding to RUs allocatable to a plurality of users, one or more empty RU entries corresponding to one or more of an empty 242-tone RU, an empty 484-tone RU and an empty 996-tone RU.

20 Claims, 11 Drawing Sheets

| Number of Entries | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 8 | 242 | | | | | | | | | | | | | | | |
| 8 | 484 | | | | | | | | | | | | | | | |
| 8 | 242 | 242 | | | | | | | | | | | | | | |
| 8 | 484 | | 484 | 484 | | | | | | | | | | | | |
| 8 | 484 | | | 242 | | | | | | | | | | | | |
| 8 | | 996 | | | | | | | | | | | | | | |
| 8 | 484 | | | 484 | | | | | | | | | | | | |
| 8 | | 996 | | | | 996 | | | | | | | | | | |
| 8 | | 996 | | | 484 | | 484 | | | | | | | | | |
| 8 | | | | | 2x996 | | | | | | | | | | | |
| 8 | 484 | | 484 | | | 996 | 996 | | | 996 | 996 | | | | | |
| 8 | | 996 | | | | 996 | | 484 | | 996 | | 484 | | | | |
| 8 | | 996 | | 484 | | 996 | 484 | | | 996 | 996 | | | | | |
| 8 | 484 | | | | | 996 | | | 484 | 996 | | | | | | |
| 8 | | 996 | | 484 | | 996 | | | | 996 | | 484 | | | | |
| 8 | 484 | | | | | 996 | 484 | | 484 | 996 | 996 | | | 484 | 996 | |
| 8 | | 996 | | | | 996 | | | | 996 | 996 | | | | 996 | |
| 8 | | 996 | | | | | | | | 996 | 996 | 996 | 996 | 996 | 996 | 484 |
| 8 | | 996 | | | | | | | | | | | | | 996 | |
| 8 | | 996 | | | | 996 | | | | 996 | 996 | | | | 996 | |
| 1 | | | | | | | | Empty 242 | | | | | | | | |
| 1 | | | | | | | | Empty 484 | | | | | | | | |
| 1 | | | | | | | | Empty 996 | | | | | | | | |
| 1 | | | | | | | | Empty 2x996 | | | | | | | | |

20MHz Subband Index

1000 

SIGNAL BETWEEN A FIRST STATION (STA) AND A SECOND STA AN EXTREME-HIGH-THROUGHPUT (EHT) PHYSICAL-LAYER PROTOCOL DATA UNIT (PPDU) INDICATING A RESOURCE UNIT (RU) ALLOCATION WITH RESPECT TO MULTIPLE USERS
1010

DETERMINE ONE OR MORE RU ALLOCATED TO THE FIRST STA OR THE SECOND STA AS INDICATED IN THE EHT PPDU BY USING A RU ALLOCATION TABLE COMPRISING, IN ADDITION TO ENTRIES CORRESPONDING TO RUs ALLOCATABLE TO A PLURALITY OF USERS, ONE OR MORE EMPTY RU ENTRIES CORRESPONDING TO ONE OR MORE OF AN EMPTY 242-TONE RU, AN EMPTY 484-TONE RU AND AN EMPTY 996-TONE RU
1020

FIG. 10

1100 

SIGNAL BETWEEN A FIRST STATION (STA) AND A SECOND STA AN EXTREME-HIGH-THROUGHPUT (EHT) PHYSICAL-LAYER PROTOCOL DATA UNIT (PPDU) INDICATING A RESOURCE UNIT (RU) ALLOCATION WITH RESPECT TO A PLURALITY OF USERS
1110

DETERMINE ONE OR MORE RU ALLOCATED TO THE FIRST STA OR THE SECOND STA AS INDICATED IN THE EHT PPDU, WITH A NUMBER OF ONE OR MORE USER FIELDS IN THE EHT PPDU BEING LESS THAN A NUMBER OF A PLURALITY OF RU ALLOCATION SUBFIELDS IN THE EHT PPDU IN AN EVENT THAT AT LEAST ONE OF THE PLURALITY OF RU ALLOCATION SUBFIELDS CORRESPONDS TO AN EMPTY RU NOT ASSIGNED TO ANY USER
1120

FIG. 11

EFFICIENT RESOURCE UNIT ALLOCATION SIGNALING IN EXTREME-HIGH-THROUGHPUT WIRELESS COMMUNICATIONS

CROSS REFERENCE TO RELATED PATENT APPLICATION

The present disclosure is part of a non-provisional patent application claiming the priority benefit of U.S. Provisional Patent Application Nos. 63/039,514 and 63/040,029, filed on 16 Jun. 2020 and 17 Jun. 2020, respectively, the contents of which being incorporated by reference in their entirety.

TECHNICAL FIELD

The present disclosure is generally related to wireless communications and, more particularly, to efficient resource unit (RU) allocation signaling in extreme-high-throughput (EHT) wireless communications.

BACKGROUND

Unless otherwise indicated herein, approaches described in this section are not prior art to the claims listed below and are not admitted as prior art by inclusion in this section.

In next-generation wireless communications such as those implemented in wireless local area networks (WLANs) based on the Institute of Electrical and Electronics Engineers (IEEE) 802.11be standard, detection of an EHT physical-layer protocol data unit (PPDU) is based on comparing the LENGTH field in the legacy signal field (L-SIG) and repeated legacy signal field (RL-SIG) to a value N such that mod(N, 3)=0. To reduce the length of the EHT signal field (EHT-SIG) of the EHT PPDU, per-80 MHz preamble signaling is preferred. However, as each station (STA) in a WLAN should only need to process a preamble (including short training field(s) (STFs) and long training field(s) (LTFs)) of a respective EHT PPDU in a given 80 MHz frequency segment, there is a need for a solution to inform each STA in which 80 MHz frequency segment its content channels are located before receiving the EHT PPDU.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to efficient RU allocation signaling in EHT wireless communications. Under various proposed schemes in accordance with the present disclosure, it is believed that issues described herein may be addressed.

In one aspect, a method may involve signaling between a first STA and a second STA an EHT PPDU indicating a RU allocation with respect to multiple users. The method may also involve determining one or more RU allocated to the first STA or the second STA as indicated in the EHT PPDU by using a RU allocation table comprising, in addition to entries corresponding to RUs allocatable to a plurality of users, one or more empty RU entries corresponding to one or more of an empty 242-tone RU, an empty 484-tone RU and an empty 996-tone RU.

In another aspect, a method may involve signaling, via the transceiver, between a first STA and a second STA an EHT PPDU indicating a RU allocation with respect to a plurality of users. The method may also involve determining one or more RU allocated to the first STA or the second STA as indicated in the EHT PPDU. A number of one or more user fields in the EHT PPDU may be less than a number of a plurality of RU allocation subfields in the EHT PPDU in an event that at least one of the plurality of RU allocation subfields corresponds to an empty RU not assigned to any user.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5$^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of an example design in accordance with an implementation of the present disclosure.

FIG. 10 is a flowchart of an example process in accordance with an implementation of the present disclosure.

FIG. 11 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to efficient RU allocation signaling in EHT wireless communications. According to the present disclosure, a number of possible solutions may be implemented separately or jointly. That is, although these possible solutions may be described below separately, two or more of these possible solutions may be implemented in one combination or another. It is noteworthy that, although examples described herein and illustrated in the figures may show a first RU of size A and a second RU of size B, as in RU A+RU B, various proposed schemes in accordance with the present disclosure may be implemented with RU A+RU B, or vice versa (e.g., RU B+RU A). In other words, the scope of the present disclosure is not limited to the examples presented herein and, rather, also covers variations thereof. For instance, for a multi-RU group (996+484), the order of RUs may be exchanged in different implementations such as, for example, a first RU of size 484 plus a second RU of size 996 in one implementation or, alternatively, a first RU of size 996 plus a second RU of size 484 in another implementation. Moreover, in the present disclosure, aggregated multiple RUs may be interchangeably referred to as "multi-RU" and "MRU". Thus, in the aforementioned example, the multi-RU group (996+484), which is an aggregation of two RUs (namely a 996-tone RU and a 484-tone RU), may be referred to as a multi-RU (996+484) or an MRU (996+484).

Figure 1:
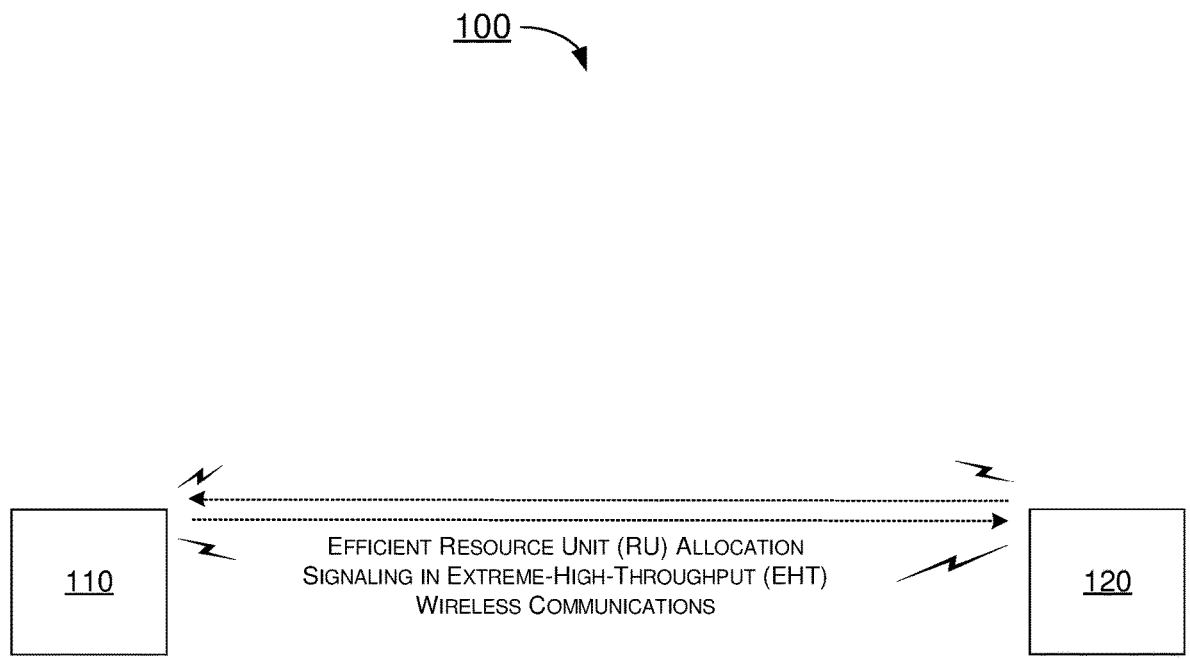
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 11 illustrate examples of implementation of various proposed schemes in network environment 100 in accordance with the present disclosure. The following description of various proposed schemes is provided with reference to FIG. 1~FIG. 11.

Referring to FIG. 1, network environment 100 may involve a communication entity 110 and a communication entity 120 communicating wirelessly (e.g., in a WLAN in accordance with one or more IEEE 802.11 standards). For instance, communication entity 110 may be a first STA and communication entity 120 may be a second STA, with each of the first STA and second STA being an access point (AP) or a non-AP STA. Under various proposed schemes in accordance with the present disclosure, communication entity 110 and communication entity 120 may be configured to perform efficient RU allocation signaling in EHT wireless communications, as described herein.

A general format of an EHT multi-user (MU) PPDU typically includes a number of fields such as a legacy short training field (L-STF), a legacy long training field (L-LTF), a legacy signal field (L-SIG), a repeated legacy signal field (RL-SIG), a universal signal field (U-SIG), an EHT signal field (EHT-SIG), an EHT short training field (EHT-STF), an EHT long training field (EHT-LTF), and a data payload. The U-SIG may have a length of two orthogonal frequency-division multiplexing (OFDM) symbols, and there may be jointly encoded U-SIG in the EHT preamble immediately after the RL-SIG. The U-SIG may contain version-independent fields. The intent of the version-independent content is to achieve better coexistence among future IEEE 802.11 generations. In addition, the U-SIG may have some version-dependent fields. As variable modulation and coding schemes (MCSs) may be utilized, the EHT-SIG may have a variable length and may be immediately after the U-SIG in the EHT PPDU. With respect to per-80 MHz preamble signaling, the U-SIG may be duplicated within each 80 MHz frequency segment. Moreover, in each 80 MHz frequency segment, there may be two or four content channels regarding the EHT-SIG.

FIG. 2 illustrates an example design 200 in one implementation under a proposed scheme in accordance with the present disclosure. Design 200 shows a large-size RU allocation table with empty RUs. Under a proposed scheme in accordance with the present disclosure, entries of empty 242-tone RU, 484-tone RU, 996-tone RU and 2×996-tone RU, or a subset of these four RUs, may be added in the RU allocation table. The term "empty RU" herein refers to an unassigned RU which corresponds to zero user field in that, for a given 80 MHz frequency segment with an entry of empty RU in the RU allocation table, there is zero or no user assigned to that empty RU in a corresponding content channel within that 80 MHz frequency segment. Thus, in the corresponding user field, there is no need to indicate the RU allocation when there is zero user assigned. Advantageously, the length of the user field in EHT-SIG may be reduced, thereby improving efficiency in signaling of RU allocation in EHT MU PPDUs.

Figure 3:
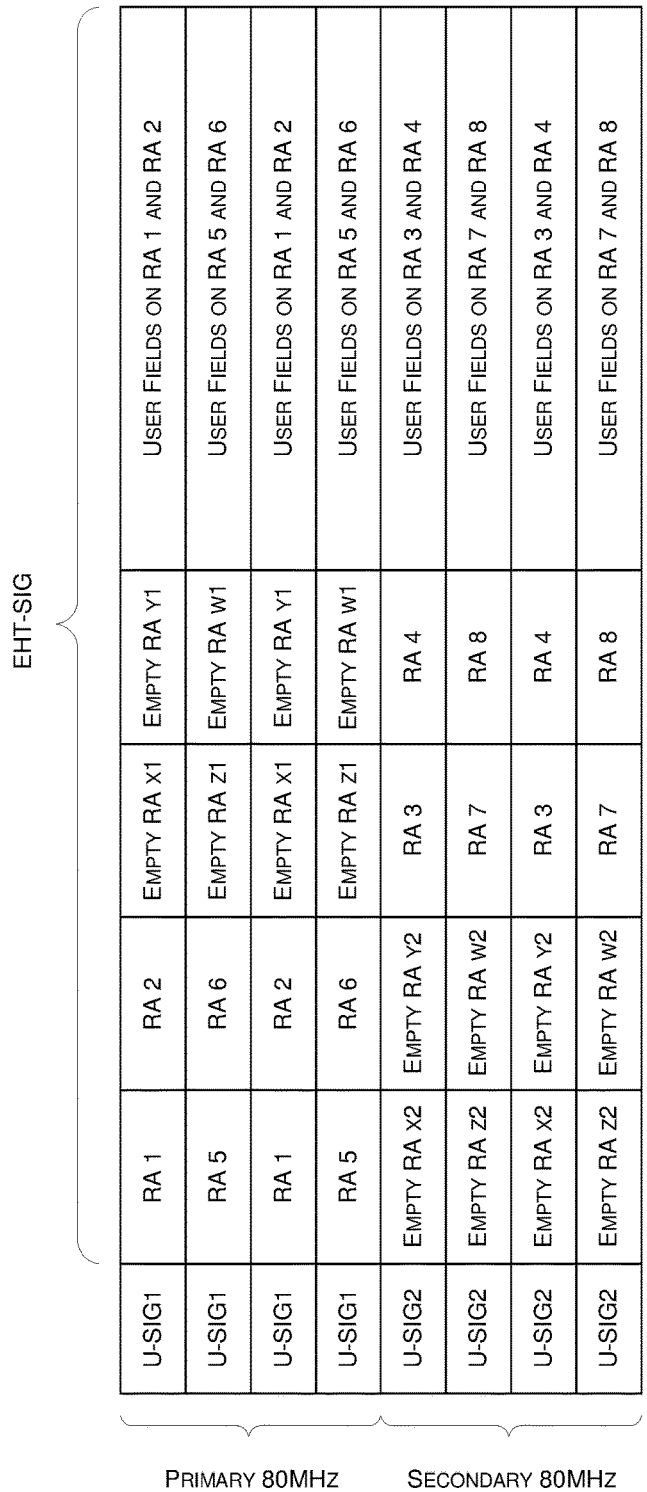
FIG. 3 is a diagram of an example scenario in accordance with an implementation of the present disclosure.

Under a proposed scheme in accordance with the present disclosure with respect to per-80 MHz EHT signaling for orthogonal frequency-division multiple access (OFDMA), in case there is no user on a set of given RUs in an 80 MHz frequency segment, corresponding empty RU entries may be placed in the RU allocation subfield in the respective content channel. FIG. 3 illustrates an example scenario 300 in one implementation in accordance with the present disclosure. Under the proposed scheme, in each 80 MHz frequency segment, only the user fields of the users parked in that 80 MHz frequency segment may be included in the EHT-SIG. In scenario 300, empty resource allocation (RA) x1 and empty RA y2 may be filled in the unassigned RUs in the first 80 MHz frequency segment on content channel 1. Similarly, empty RA z1 and empty RA w1 may be filled in the unassigned RUs in the first 80 MHz frequency segment on content channel 2. Likewise, empty RA x2 and empty RA y2 may be filled in the unassigned RUs in the first 80 MHz frequency segment on content channel 1. Moreover, empty RA z2 and empty RA w2 may be filled in the unassigned RUs in the first 80 MHz frequency segment on content channel 2. It is believed that this proposed scheme would introduce the least amount of changes to HE-SIGB style signaling and may enable the flexibility of per-80 MHz signaling.

FIG. 3 illustrates an example scenario 300 in one implementation under a proposed scheme in accordance with the present disclosure. In scenario 300, each of a primary 80 MHz frequency segment and a secondary 80 MHz frequency segment may have four respective 20 MHz content channels. In the primary 80 MHz frequency segment, the U-SIG for each of the four 20 MHz content channels may be U-SIG1. In the second 80 MHz frequency segment, the U-SIG for each of the four 20 MHz content channels may be U-SIG2.

Referring to FIG. 3, in the primary 80 MHz frequency segment, the EHT-SIG for a first of the four 20 MHz content channels for content channel 1 may have RU Allocation subfields filled with "RA 1", "RA 2", "Empty RA x1" and "Empty RA y1" as two of RUs are unassigned and, correspondingly, only the user fields of the users parked in that 20 MHz content channel (namely, user fields for RA 1 and RA 2) are included. Similarly, the EHT-SIG for a second of the four 20 MHz content channels for content channel 2 may have RU Allocation subfields filled with "RA 5", "RA 6", "Empty RA z1" and "Empty RA w1" as two of RUs are unassigned and, correspondingly, only the user fields of the users parked in that 20 MHz content channel (namely, user fields for RA 5 and RA 6) are included. Likewise, the EHT-SIG for a third of the four 20 MHz content channels for content channel 1 may have RU Allocation subfields filled with "RA 1", "RA 2", "Empty RA x1" and "Empty RA y1" as two of RUs are unassigned and, correspondingly, only the user fields of the users parked in that 20 MHz content channel (namely, user fields for RA 1 and RA 2) are included. Moreover, the EHT-SIG for a fourth of the four 20 MHz content channels for content channel 2 may have RU Allocation subfields filled with "RA 5", "RA 6", "Empty RA z1" and "Empty RA w1" as two of RUs are unassigned and, correspondingly, only the user fields of the users parked in that 20 MHz content channel (namely, user fields for RA 5 and RA 6) are included.

Additionally, in the secondary 80 MHz frequency segment, the EHT-SIG for a first of the four 20 MHz content channels for content channel 1 may have RU Allocation subfields filled with "Empty RA x2", "Empty RA y2", "RA 3" and "RA 4" as two of RUs are unassigned and, correspondingly, only the user fields of the users parked in that 20 MHz content channel (namely, user fields for RA 3 and RA 4) are included. Similarly, the EHT-SIG for a second of the four 20 MHz content channels for content channel 2 may have RU Allocation subfields filled with "Empty RA z2", "Empty RA w2", "RA 7" and "RA 8" as two of RUs are unassigned and, correspondingly, only the user fields of the users parked in that 20 MHz content channel (namely, user fields for RA 7 and RA 8) are included. Likewise, the EHT-SIG for a third of the four 20 MHz content channels for content channel 1 may have RU Allocation subfields filled with "Empty RA x2", "Empty RA y2", "RA 3" and "RA 4" as two of RUs are unassigned and, correspondingly, only the user fields of the users parked in that 20 MHz content channel (namely, user fields for RA 3 and RA 4) are included. Furthermore, the EHT-SIG for a fourth of the four 20 MHz content channels for content channel 2 may have RU Allocation subfields filled with "Empty RA z2", "Empty RA w2", "RA 7" and "RA 8" as two of RUs are unassigned and, correspondingly, only the user fields of the users parked in that 20 MHz content channel (namely, user fields for RA 7 and RA 8) are included.

Under a proposed scheme in accordance with the present disclosure, in an event that one RU or MRU is referred to by two or more RU Allocation subfields in an EHT-SIG content channel, one of the two or more RU Allocation subfields other than a first one of the two or more RU Allocation subfields in the EHT-SIG content channel may be utilized to encode one or more empty additional User fields per RU contributed to a User Specific field in a same EHT-SIG content channel as the one of the two or more RU Allocation subfields.

Under a proposed scheme in accordance with the present disclosure with respect to localized RU allocation within each 80 MHz frequency segment, all STAs may obtain RU assignment within each parked segment. Significant overhead reduction may be achieved with two RU allocation subfields and only user fields for STAs assigned on the segment. A localized mode indicator may be inserted in the U-SIG to indicate the EHT-SIG using localized RU indication.

Figure 4:
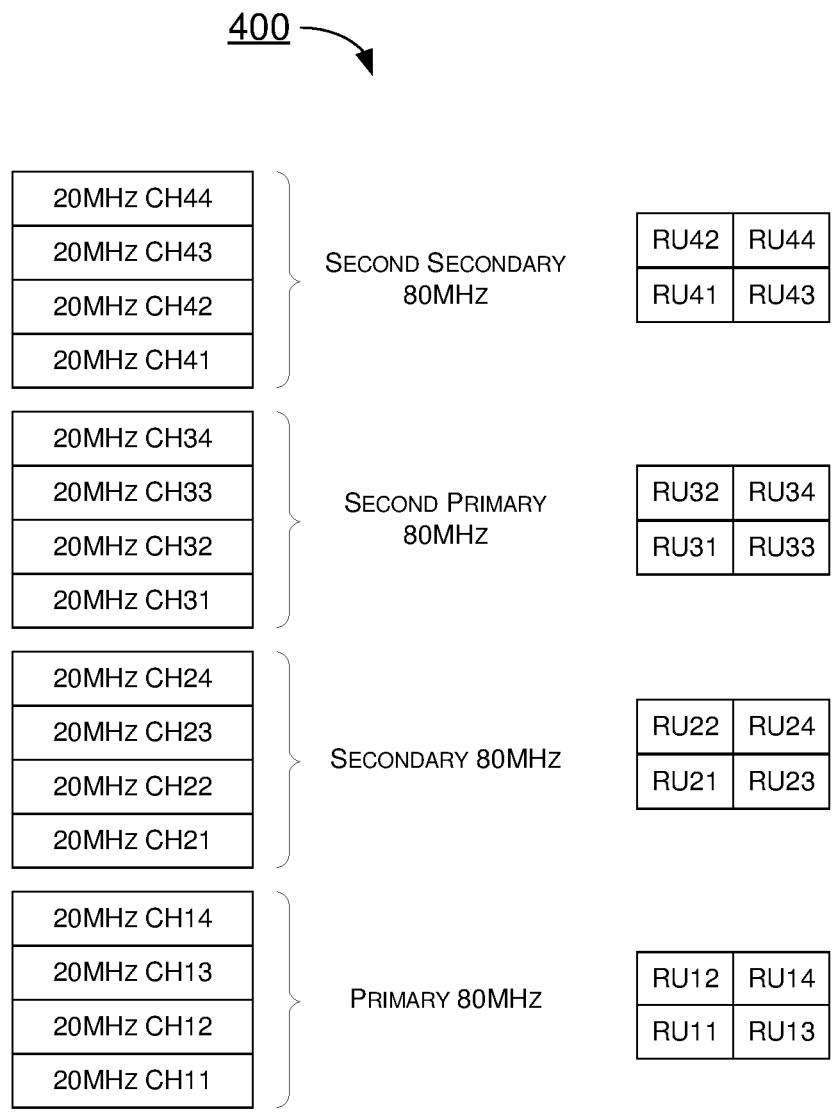
FIG. 4 is a diagram of an example scenario in accordance with an implementation of the present disclosure.

FIG. 4 illustrates an example scenario 400 in one implementation under a proposed scheme in accordance with the present disclosure. In scenario 400, each of a primary 80 MHz frequency segment, a secondary 80 MHz frequency segment, a second primary 80 MHz frequency segment, and a second secondary 80 MHz frequency segment may have respective four 20 MHz content channels. As shown in FIG. 4, the primary 80 MHz frequency segment may have four 20 MHz content channels denoted as CH11, CH12, CH13 and CH14, the secondary 80 MHz frequency segment may have four 20 MHz content channels denoted as CH21, CH22, CH23 and CH24, the second primary 80 MHz frequency segment may have four 20 MHz content channels denoted as CH31, CH32, CH33 and CH34, and the second secondary 80 MHz frequency segment may have four 20 MHz content channels denoted as CH41, CH42, CH43 and CH44. Under the proposed scheme, with localized RU allocation within each 80 MHz frequency channel, RU11, RU12, RU13 and RU14 may be allocated to CH11, CH12, CH13 and CH14, respectively. Similarly, RU21, RU22, RU23 and RU24 may be allocated to CH21, CH22, CH23 and CH24, respectively. Likewise, RU31, RU32, RU33 and RU34 may be allocated to CH31, CH32, CH33 and CH34, respectively. Moreover, RU41, RU42, RU43 and RU44 may be allocated to CH41, CH42, CH43 and CH44, respectively.

Under a proposed scheme in accordance with the present disclosure with respect to HE-SIGB RU signaling for multi-user multiple-input-multiple-output (MU-MIMO), load balancing on two or more content channels may be improved. Under the proposed scheme, for a RU of a size greater than 242 tones, such as a 484-tone RU, two HE-SIGB content channels may be utilized with each content channel having an 8-bit RU Allocation subfield. For instance, in a first content channel (or content channel #1), the respective 8-bit RU Allocation subfield may be $11001y_2y_1y_0$, with $y_2y_1y_0=011$. Similarly, in a second content channel (or content channel #2), the respective 8-bit RU Allocation subfield may be $11001y_2y_1y_0$, with $y_2y_1y_0=010$. Here, $y_2y_1y_0=000$ indicates one user, $y_2y_1y_0=001$ indicates two users, $y_2y_1y_0=010$ indicates three users, and $y_2y_1y_0=011$ indicates four users. Accordingly, in content channel #1, there are four user fields in the user-specific field. Similarly, in content channel #2, there are three user fields in the user-specific field. Thus, in this example, the total number of multiplex users on this 484-tone RU is 3+4=7 users. As such, a STA may decode the two content channels to determine the whole RU signaling.

It is noteworthy that the HE-SIGB style User Field format may not support per-80 MHz efficient signaling. Accordingly, a STA may need to be aware of a total number of spatial streams and its user position to determine a respective index of its spatial stream(s). Consequently, STAs operating on the secondary 80 MHz frequency segment may need to have information of STAs operating in the primary 80 MHz frequency segment, and vice versa. To address this issue, one or multiple of the several proposed schemes described below with respect to a self-contained spatial configuration of User Field format for MU-MIMO may be utilized.

Figure 5:
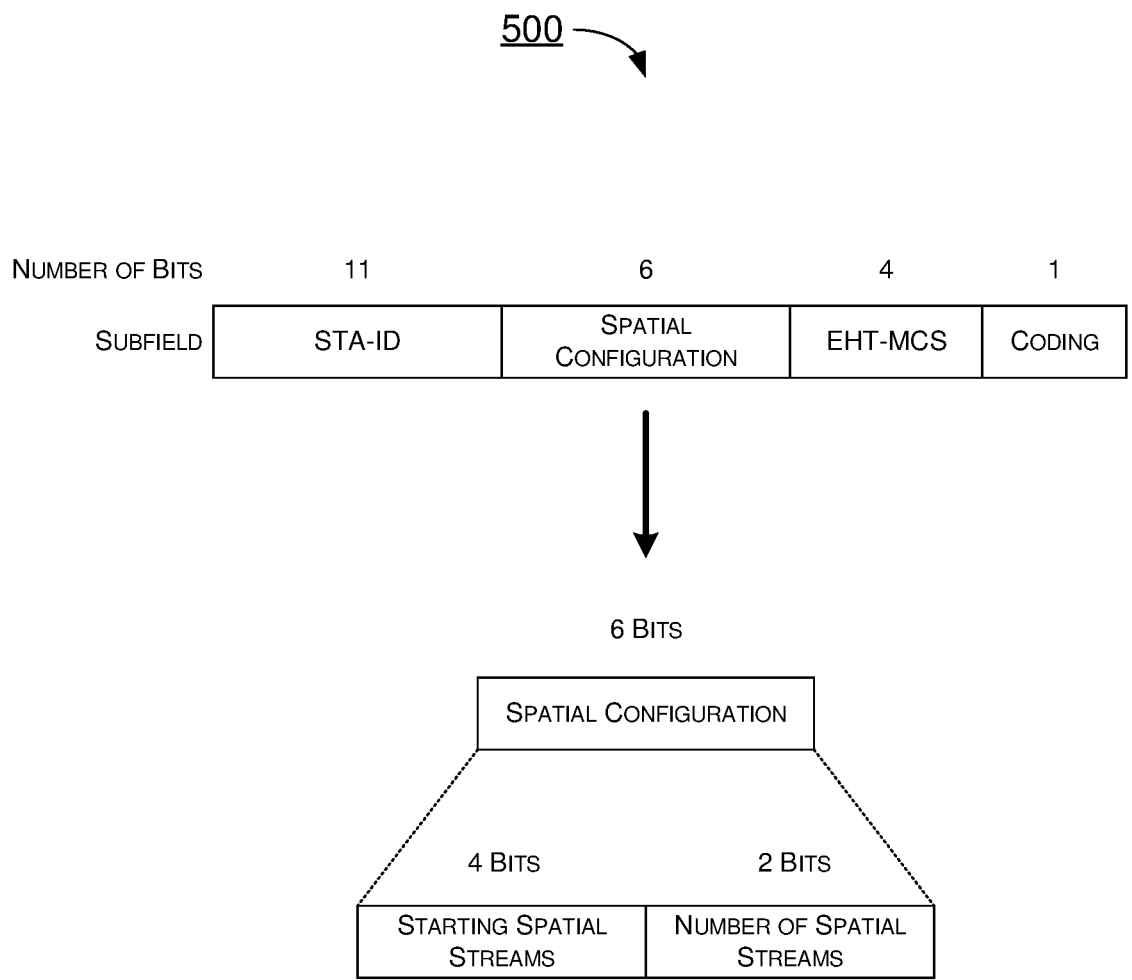
FIG. 5 is a diagram of an example design in accordance with an implementation of the present disclosure.

FIG. 5 illustrates an example design 500 in one implementation under a proposed scheme in accordance with the present disclosure. Referring to FIG. 5, in design 500, the User Field may include at least a STA identifier (ID) subfield, a Spatial Configuration subfield, an EHT-MCS subfield and a coding subfield. The STA ID may indicate an ID of a user/STA being addressed as the intended recipient. The Spatial Configuration subfield may indicate information related to spatial stream configuration. The EHT-MCS subfield may indicate MCS scheme in use. The coding subfield may indicate the coding scheme in use. In design 500, a Spatial Configuration subfield in the User Field may have six bits. In particular, in the 6-bit Spatial Configuration subfield, four bits may be utilized to indicate a spatial starting index for a given user (e.g., STA) and two bits may be utilized to indicate a number of spatial streams assigned to that user. Thus, design 500 may support up to total eight users, up to total sixteen spatial streams, and up to total four streams per user.

Figure 6:
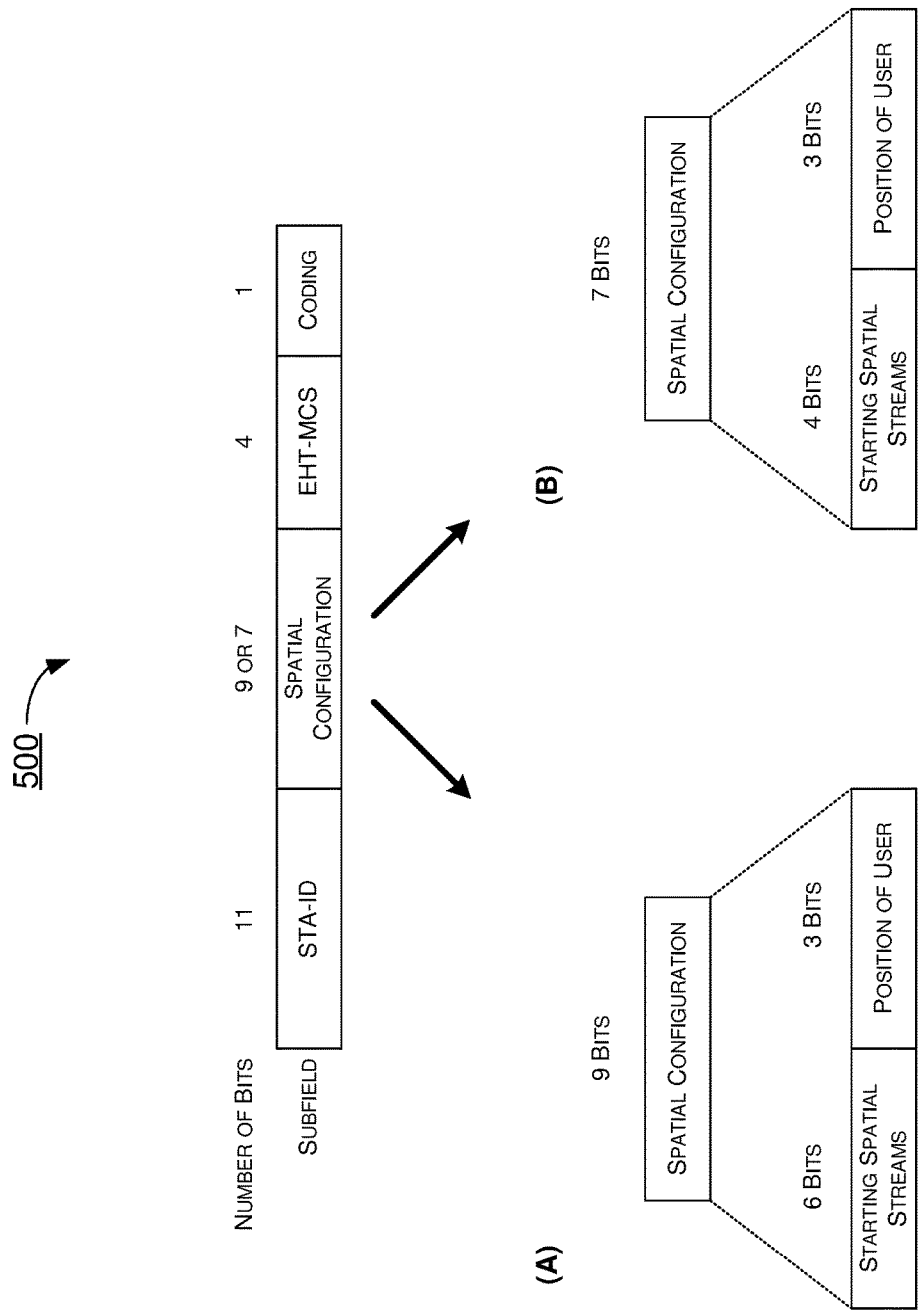
FIG. 6 is a diagram of an example design in accordance with an implementation of the present disclosure.

FIG. 6 illustrates an example design 600 in one implementation under a proposed scheme in accordance with the present disclosure. Referring to FIG. 6, in design 600, the User Field may include at least a STA ID subfield, a Spatial Configuration subfield, an EHT-MCS subfield and a coding subfield. The STA ID may indicate an ID of a user/STA being addressed as the intended recipient. The Spatial Configuration subfield may indicate information related to spatial stream configuration. The EHT-MCS subfield may indicate MCS scheme in use. The coding subfield may indicate the coding scheme in use. Referring to part (A) of FIG. 6, in design 600, a Spatial Configuration subfield in the User Field may have nine bits. In particular, in the 9-bit Spatial Configuration subfield, six bits may be utilized to indicate a spatial stream configuration for a given user in an MU-MIMO allocation. In an event that the Spatial Configuration subfield encoding is to expand to sixteen spatial streams from eight spatial streams, six bits would be needed. Moreover, in the 9-bit Spatial Configuration subfield, three bits may be utilized to indicate the respective position of that user. Referring to part (B) of FIG. 6, in design 600, the Spatial Configuration subfield in the User Field may have seven bits. In particular, in the 7-bit Spatial Configuration subfield, four bits may be utilized to indicate a spatial stream configuration for a given user in an MU-MIMO allocation. Moreover, in the 9-bit Spatial Configuration subfield, three bits may be utilized to indicate the respective position of that user.

Figure 7:
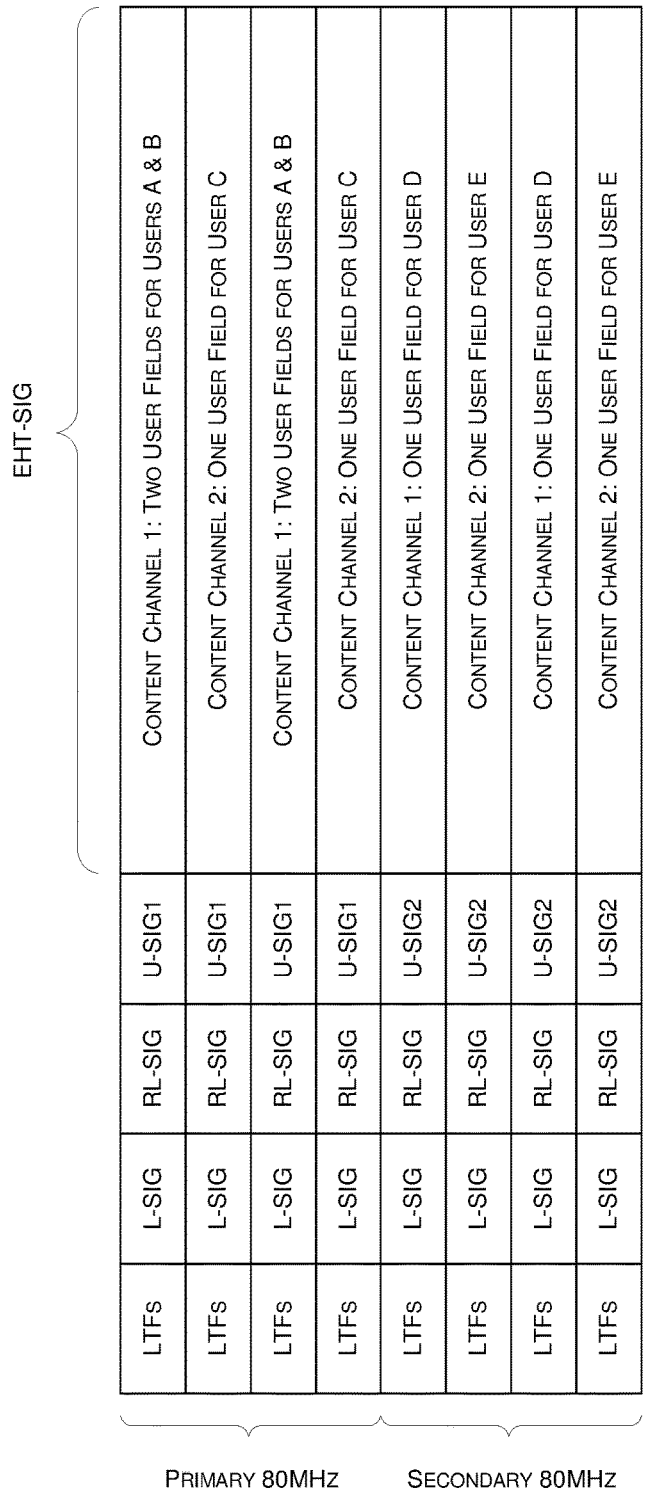
FIG. 7 is a diagram of an example scenario in accordance with an implementation of the present disclosure.

FIG. 7 illustrates an example scenario 700 in one implementation under a proposed scheme in accordance with the present disclosure. For MU-MIMO (compression modes and non-compression modes), efficient per-80 MHz RU signaling may be desirable. For instance, as an illustrative example, there may be total five users of MU-MIMO on a 2×996 RU. In a first content channel (or content channel #1) in a primary 80 MHz frequency segment, the respective 8-bit RU Allocation subfield may be $11001y_2y_1y_0$, with $y_2y_1y_0=001$. In a second content channel (or content channel #2) in the primary 80 MHz frequency segment, the respective 8-bit RU Allocation subfield may be $11001y_2y_1y_0$, with $y_2y_1y_0=000$. Here, $y_2y_1y_0=000$ indicates one user, $y_2y_1y_0=001$ indicates two users, $y_2y_1y_0=010$ indicates three users, and $y_2y_1y_0=011$ indicates four users. Thus, as indicated, there are two users (user A and user B) on content channel #1 and one user (user C) on content channel #2 in the primary 80 MHz frequency segment. In a first content channel (or content channel #1) in a secondary 80 MHz frequency segment, the respective 8-bit RU Allocation subfield may be $11001y_2y_1y_0$, with $y_2y_1y_0=000$. In a second content channel (or content channel #2) in the secondary 80 MHz frequency segment, the respective 8-bit RU Allocation subfield may be $11001y_2y_1y_0$, with $y_2y_1y_0=000$. Thus, as indicated, there are one user (user D) on content channel #1 and one user (user E) on content channel #2 in the secondary 80 MHz frequency segment.

In scenario 700, efficiency in signaling may be achieved in that the EHT-SIG in each 80 MHz frequency segment may need to contain just the user fields of the STAs operating in that 80 MHz frequency segment and not contain any user field of any STA that is not operating therein. Accordingly, as shown in FIG. 7, for the primary 80 MHz frequency segment, the EHT-SIG may contain two user fields (for user A and user B) in content channel #1 and one user field (for user C) in content channel #2. Likewise, for the secondary 80 MHz frequency segment, the EHT-SIG may contain one user field (for user D) in content channel #1 and one user field (for user E) in content channel #2.

Figure 8:
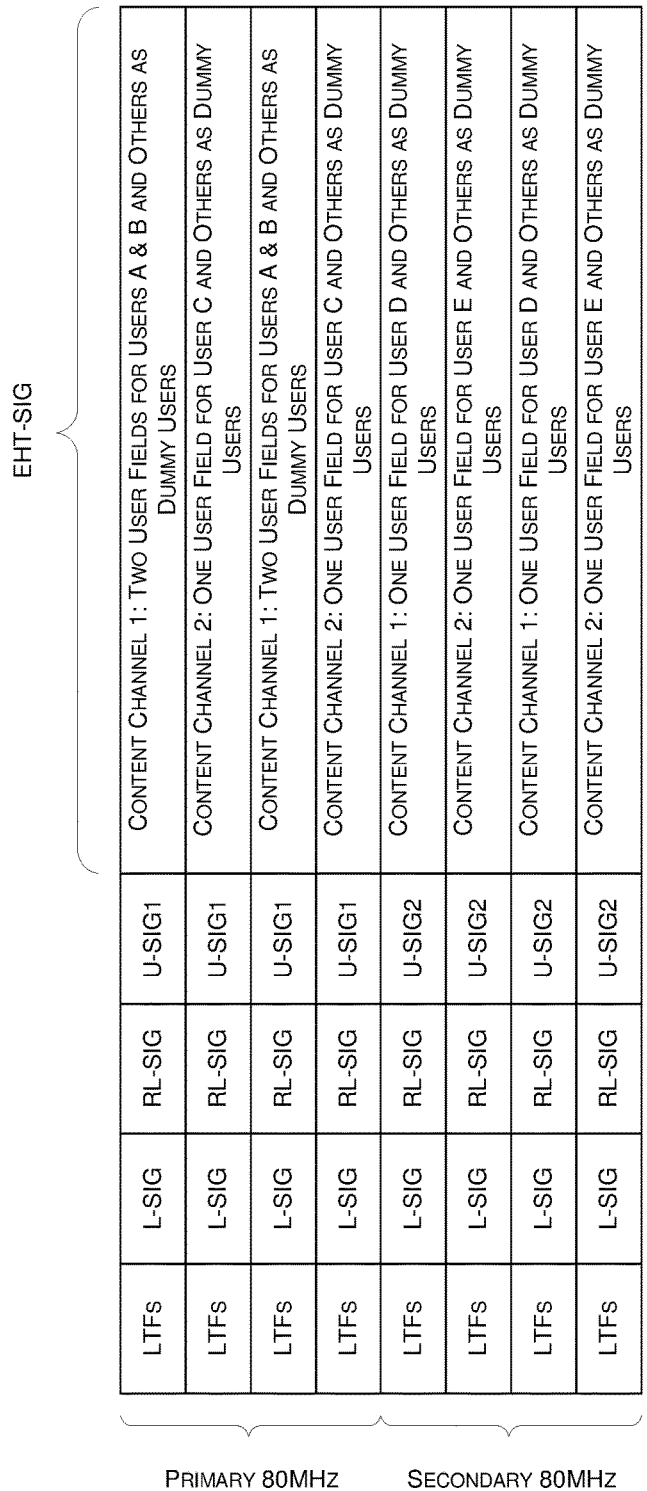
FIG. 8 is a diagram of an example scenario in accordance with an implementation of the present disclosure.

FIG. 8 illustrates an example scenario 800 in one implementation under a proposed scheme in accordance with the present disclosure. For per-80 MHz RU signaling in MU-MIMO, a 6-bit expanded Spatial Configuration subfield may be utilized in the User Field. Under the proposed scheme, for MU-MIMO (both full-bandwidth MU-MIMO in the compression modes or hybrid MU-MIMO and OFDMA modes), a Dummy User field may be utilized for users not parked in a given 80 MHz frequency segment for MIMO. Borrowing the example described above with respect to scenario 700, in scenario 800, for the primary 80 MHz frequency segment, the EHT-SIG may contain two user fields (for user A and user B) and others as dummy users in content channel #1 and one user field (for user C) and others as dummy users in content channel #2. Likewise, for the secondary 80 MHz frequency segment, the EHT-SIG may contain one user field (for user D) and others as dummy users in content channel #1 and one user field (for user E) and others as dummy users in content channel #2.

Illustrative Implementations

Figure 9:
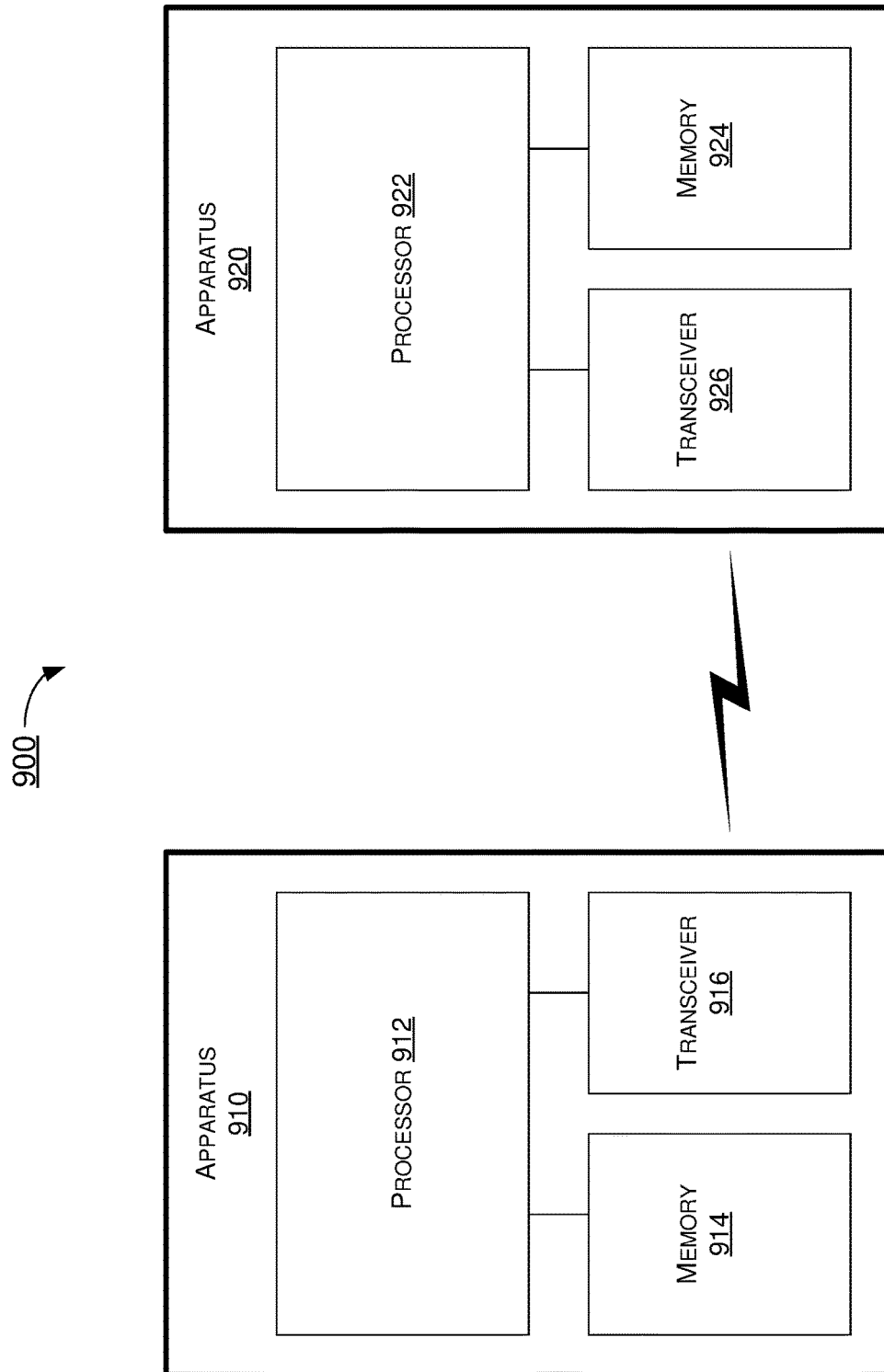
FIG. 9 is a block diagram of an example communication system in accordance with an implementation of the present disclosure.

FIG. 9 illustrates an example system 900 having at least an example apparatus 910 and an example apparatus 920 in accordance with an implementation of the present disclosure. Each of apparatus 910 and apparatus 920 may perform various functions to implement schemes, techniques, processes and methods described herein pertaining to efficient RU allocation signaling in EHT wireless communications, including the various schemes described above with respect to various proposed designs, concepts, schemes, systems and methods described above as well as processes described below. For instance, apparatus 910 may be an example implementation of communication entity 110, and apparatus 920 may be an example implementation of communication entity 120.

Each of apparatus 910 and apparatus 920 may be a part of an electronic apparatus, which may be a STA or an AP, such as a portable or mobile apparatus, a wearable apparatus, a wireless communication apparatus or a computing apparatus. For instance, each of apparatus 910 and apparatus 920 may be implemented in a smartphone, a smart watch, a personal digital assistant, a digital camera, or a computing equipment such as a tablet computer, a laptop computer or a notebook computer. Each of apparatus 910 and apparatus 920 may also be a part of a machine type apparatus, which may be an IoT apparatus such as an immobile or a stationary apparatus, a home apparatus, a wire communication apparatus or a computing apparatus. For instance, each of apparatus 910 and apparatus 920 may be implemented in a smart thermostat, a smart fridge, a smart door lock, a wireless speaker or a home control center. When implemented in or as a network apparatus, apparatus 910 and/or apparatus 920 may be implemented in a network node, such as an AP in a WLAN.

In some implementations, each of apparatus 910 and apparatus 920 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 910 and apparatus 920 may be implemented in or as a STA or an AP. Each of apparatus 910 and apparatus 920 may include at least some of those components shown in FIG. 9 such as a processor 912 and a processor 922, respectively, for example. Each of apparatus 910 and apparatus 920 may further include one or more other components not pertinent to the proposed scheme of the present disclosure (e.g., internal power supply, display device and/or user interface device), and, thus, such component(s) of apparatus 910 and apparatus 920 are neither shown in FIG. 9 nor described below in the interest of simplicity and brevity.

In one aspect, each of processor 912 and processor 922 may be implemented in the form of one or more single-core processors, one or more multi-core processors, one or more RISC processors or one or more CISC processors. That is, even though a singular term "a processor" is used herein to refer to processor 912 and processor 922, each of processor 912 and processor 922 may include multiple processors in some implementations and a single processor in other implementations in accordance with the present disclosure. In another aspect, each of processor 912 and processor 922 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 912 and processor 922 is a special-purpose machine specifically designed, arranged and configured to perform specific tasks including those pertaining to efficient RU allocation signaling in EHT wireless communications in accordance with various implementations of the present disclosure. For instance, each of processor 912 and processor 922 may be configured with hardware components, or circuitry, implementing one, some or all of the examples described and illustrated herein.

In some implementations, apparatus 910 may also include a transceiver 916 coupled to processor 912. Transceiver 916 may be capable of wirelessly transmitting and receiving data. In some implementations, apparatus 920 may also include a transceiver 926 coupled to processor 922. Transceiver 926 may include a transceiver capable of wirelessly transmitting and receiving data.

In some implementations, apparatus 910 may further include a memory 914 coupled to processor 912 and capable of being accessed by processor 912 and storing data therein.

In some implementations, apparatus 920 may further include a memory 924 coupled to processor 922 and capable of being accessed by processor 922 and storing data therein. Each of memory 914 and memory 924 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 914 and memory 924 may include a type of read-only memory (ROM) such as mask ROM, programmable ROM (PROM), erasable programmable ROM (EPROM) and/or electrically erasable programmable ROM (EEPROM). Alternatively, or additionally, each of memory 914 and memory 924 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 910 and apparatus 920 may be a communication entity capable of communicating with each other using various proposed schemes in accordance with the present disclosure. For illustrative purposes and without limitation, a description of capabilities of apparatus 910, as communication entity 110, and apparatus 920, as communication entity 120, is provided below. It is noteworthy that, although the example implementations described below are provided in the context of WLAN, the same may be implemented in other types of networks. Thus, although the following description of example implementations pertains to a scenario in which apparatus 910 functions as a transmitting device and apparatus 920 functions as a receiving device, the same is also applicable to another scenario in which apparatus 910 functions as a receiving device and apparatus 920 functions as a transmitting device.

Under a proposed scheme in accordance with the present disclosure with respect to efficient RU allocation signaling in EHT wireless communications, processor 912 of apparatus 910 may establish, via transceiver 916, a wireless communication link between a first STA (e.g., apparatus 910 implemented in communication entity 110 as a non-AP STA) and a second STA (e.g., apparatus 920 implemented in communication entity 120 as an AP) in an EHT WLAN. For instance, processor 912 may receive, via transceiver 916, the EHT PPDU from apparatus 920. Additionally, processor 912 may determine one or more RU allocated to the first STA as indicated in the EHT PPDU by using a RU allocation table. The RU allocation table may include, in addition to entries corresponding to RUs allocatable to a plurality of users, one or more empty RU entries corresponding to one or more of an empty 242-tone RU, an empty 484-tone RU and an empty 996-tone RU. Alternatively, processor 912 may determine one or more RU allocated to the first STA as indicated in the EHT PPDU, with a number of one or more user fields in the EHT PPDU being less than a number of a plurality of RU allocation subfields in the EHT PPDU in an event that at least one of the plurality of RU allocation subfields corresponds to an empty RU not assigned to any user.

In some implementations, in determining the one or more RU allocated, processor 912 may determine the one or more RU allocated by using a RU allocation table. The RU allocation table may include, in addition to entries corresponding to RUs allocatable to the plurality of users, one or more empty RU entries corresponding to one or more of an empty 242-tone RU, an empty 484-tone RU and an empty 996-tone RU.

In some implementations, there may be zero user allocated on each of the empty 242-tone RU, the empty 484-tone RU and the empty 996-tone RU. In some implementations, the RU allocation table may further include an empty RU entry corresponding to an empty 2×996-tone RU, and there may be zero user allocated on the empty 2×996-tone RU.

In some implementations, the EHT PPDU may indicate a respective RU allocation for each of one or more frequency segments. In such cases, for at least one of the one or more frequency segments, a respective EHT-SIG may contain at least a first RU allocation subfield and a second RU allocation subfield for at least one of a plurality of content channels in the at least one of the one or more frequency segments. Additionally, the first RU allocation subfield may be filled with a non-empty entry from the RU allocation table indicating that there is a user on one or more RUs corresponding to the non-empty entry. Moreover, the second RU allocation subfield may be filled with one of the one or more empty RU entries indicating that there is no user on one or more RUs corresponding to the one of the one or more empty RU entries.

In some implementations, for the at least one of the one or more frequency segments, the respective EHT-SIG may further contain a user field corresponding to the first RU allocation subfield and no user field corresponding to the second RU allocation subfield.

In some implementations, the one or more frequency segments may include one or more 80 MHz frequency segments in an 80 MHz, 160 MHz or 320 MHz bandwidth utilized in communications between the first STA and the second STA in the EHT WLAN.

In some implementations, the EHT PPDU may indicate a respective RU allocation for each of one or more 80 MHz frequency segments. In such cases, in each of the one or more 80 MHz frequency segments, each of one or more respective EHT-SIGs may contain one or more respective RU allocations of RUs in the respective frequency segment that are allocated to one or more users of the plurality of users parked in the respective frequency segment.

In some implementations, in signaling, processor 912 may signal, via transceiver 916, for MU-MIMO. In such cases, the EHT PPDU may indicate an allocation of a RU of a size greater than 242 tones over more than one content channel including a first content channel and a second content channel. For instance, a first 8-bit RU allocation subfield corresponding to the first content channel may indicate a first number of users to which a corresponding first number of RUs are allocated. Moreover, the EHT PPDU may contain a first number of user fields corresponding to the first number of users for the first content channel. Similarly, a second 8-bit RU allocation subfield corresponding to the second content channel may indicate a second number of users to which a corresponding second number of RUs are allocated. Furthermore, the EHT PPDU may contain a second number of user fields corresponding to the second number of users for the second content channel.

In some implementations, in signaling, processor 912 may signal, via transceiver 916, for MU-MIMO. In such cases, the EHT PPDU may indicate a MU-MIMO allocation of one or more RUs to one or more users of the plurality of users. Additionally, the EHT PPDU may contain one or more user fields each corresponding to a respective one of the one or more users. Moreover, each of the one or more user fields may contain a spatial configuration subfield that includes: (a) 6 bits indicating a spatial stream configuration for a respective user among the one or more users in the MU-MIMO allocation and 3 bits indicating a position of the respective user, or (b) 4 bits indicating a starting spatial index of the respective user and 2 bits indicating a number of spatial streams assigned to the respective user.

In some implementations, in signaling, processor 912 may signal, via transceiver 916, for MU-MIMO. In such cases, for a respective frequency segment of one or more frequency segments, an EHT-SIG in the EHT PPDU may contain one or more user fields corresponding to one or more users of the plurality of users to which one or more respective RUs are allocated in the respective frequency segment. In such cases, a number of the one or more user fields in the EHT-SIG for the respective frequency segment is equal to a number of the one or more users to which the one or more respective RUs are allocated in the respective frequency segment.

In some implementations, in an event that one RU or MRU is referred to by two or more RU Allocation subfields in an EHT-SIG content channel, one of the two or more RU Allocation subfields other than a first one of the two or more RU Allocation subfields in the EHT-SIG content channel may be utilized to encode one or more empty additional User fields per RU contributed to a User Specific field in a same EHT-SIG content channel as the one of the two or more RU Allocation subfields.

Illustrative Processes

FIG. 10 illustrates an example process 1000 in accordance with an implementation of the present disclosure. Process 1000 may represent an aspect of implementing various proposed designs, concepts, schemes, systems and methods described above. More specifically, process 1000 may represent an aspect of the proposed concepts and schemes pertaining to efficient RU allocation signaling in EHT wireless communications in accordance with the present disclosure. Process 1000 may include one or more operations, actions, or functions as illustrated by one or more of blocks 1010 and 1020. Although illustrated as discrete blocks, various blocks of process 1000 may be divided into additional blocks, combined into fewer blocks, or eliminated, depending on the desired implementation. Moreover, the blocks/sub-blocks of process 1000 may be executed in the order shown in FIG. 10 or, alternatively in a different order. Furthermore, one or more of the blocks/sub-blocks of process 1000 may be executed repeatedly or iteratively. Process 1000 may be implemented by or in apparatus 910 and apparatus 920 as well as any variations thereof. Solely for illustrative purposes and without limiting the scope, process 1000 is described below in the context of apparatus 910 as communication entity 110 (e.g., a transmitting device whether a STA or an AP) and apparatus 920 as communication entity 120 (e.g., a receiving device whether a STA or an AP) of a wireless network such as a WLAN in accordance with one or more of IEEE 802.11 standards. Process 1000 may begin at block 1010.

At 1010, process 1000 may involve signaling between a first STA (e.g., apparatus 910 implemented in communication entity 110 as a non-AP STA) and a second STA (e.g., apparatus 920 implemented in communication entity 120 as an AP) an EHT PPDU indicating a RU allocation with respect to multiple users. For instance, processor 912 of apparatus 910 may receive, via transceiver 916, the EHT PPDU from apparatus 920. Process 1000 may proceed from 1010 to 1020.

At 1020, process 1000 may involve determining one or more RU allocated to the first STA or the second STA as indicated in the EHT PPDU by using a RU allocation table. The RU allocation table may include, in addition to entries corresponding to RUs allocatable to a plurality of users, one or more empty RU entries corresponding to one or more of an empty 242-tone RU, an empty 484-tone RU and an empty 996-tone RU. For instance, processor 912 may determine which one or more RUs has/have been allocated to apparatus 910 as indicated in the received EHT PPDU by using the RU allocation table.

In some implementations, there may be zero user allocated on each of the empty 242-tone RU, the empty 484-tone RU and the empty 996-tone RU. In some implementations, the RU allocation table may further include an empty RU entry corresponding to an empty 2×996-tone RU, and there may be zero user allocated on the empty 2×996-tone RU.

In some implementations, the EHT PPDU may indicate a respective RU allocation for each of one or more frequency segments. In such cases, for at least one of the one or more frequency segments, a respective EHT-SIG may contain at least a first RU allocation subfield and a second RU allocation subfield for at least one of a plurality of content channels in the at least one of the one or more frequency segments. Additionally, the first RU allocation subfield may be filled with a non-empty entry from the RU allocation table indicating that there is a user on one or more RUs corresponding to the non-empty entry. Moreover, the second RU allocation subfield may be filled with one of the one or more empty RU entries indicating that there is no user on one or more RUs corresponding to the one of the one or more empty RU entries.

In some implementations, for the at least one of the one or more frequency segments, the respective EHT-SIG may further contain a user field corresponding to the first RU allocation subfield and no user field corresponding to the second RU allocation subfield.

In some implementations, the one or more frequency segments may include one or more 80 MHz frequency segments in an 80 MHz, 160 MHz or 320 MHz bandwidth utilized in communications between the first STA and the second STA in an EHT WLAN.

In some implementations, the EHT PPDU may indicate a respective RU allocation for each of one or more 80 MHz frequency segments. In such cases, in each of the one or more 80 MHz frequency segments, each of one or more respective EHT-SIGs may contain one or more respective RU allocations of RUs in the respective frequency segment that are allocated to one or more users of the plurality of users parked in the respective frequency segment.

In some implementations, in signaling, process 1000 may involve signaling for MU-MIMO. In such cases, the EHT PPDU may indicate an allocation of a RU of a size greater than 242 tones over more than one content channel including a first content channel and a second content channel. For instance, a first 8-bit RU allocation subfield corresponding to the first content channel may indicate a first number of users to which a corresponding first number of RUs are allocated. Moreover, the EHT PPDU may contain a first number of user fields corresponding to the first number of users for the first content channel. Similarly, a second 8-bit RU allocation subfield corresponding to the second content channel may indicate a second number of users to which a corresponding second number of RUs are allocated. Furthermore, the EHT PPDU may contain a second number of user fields corresponding to the second number of users for the second content channel.

In some implementations, in signaling, process 1000 may involve signaling for MU-MIMO. In such cases, the EHT PPDU may indicate a MU-MIMO allocation of one or more RUs to one or more users of the plurality of users. Additionally, the EHT PPDU may contain one or more user fields each corresponding to a respective one of the one or more users. Moreover, each of the one or more user fields may contain a spatial configuration subfield that includes: (a) 6 bits indicating a spatial stream configuration for a respective user among the one or more users in the MU-MIMO allocation and 3 bits indicating a position of the respective user, or (b) 4 bits indicating a starting spatial index of the respective user and 2 bits indicating a number of spatial streams assigned to the respective user.

In some implementations, in signaling, process 1000 may involve signaling for MU-MIMO. In such cases, for a respective frequency segment of one or more frequency segments, an EHT-SIG in the EHT PPDU may contain one or more user fields corresponding to one or more users of the plurality of users to which one or more respective RUs are allocated in the respective frequency segment. In such cases, a number of the one or more user fields in the EHT-SIG for the respective frequency segment is equal to a number of the one or more users to which the one or more respective RUs are allocated in the respective frequency segment.

In some implementations, in an event that one RU or MRU is referred to by two or more RU Allocation subfields in an EHT-SIG content channel, one of the two or more RU Allocation subfields other than a first one of the two or more RU Allocation subfields in the EHT-SIG content channel may be utilized to encode one or more empty additional User fields per RU contributed to a User Specific field in a same EHT-SIG content channel as the one of the two or more RU Allocation subfields.

FIG. 11 illustrates an example process 1100 in accordance with an implementation of the present disclosure. Process 1100 may represent an aspect of implementing various proposed designs, concepts, schemes, systems and methods described above. More specifically, process 1100 may represent an aspect of the proposed concepts and schemes pertaining to efficient RU allocation signaling in EHT wireless communications in accordance with the present disclosure. Process 1100 may include one or more operations, actions, or functions as illustrated by one or more of blocks 1110 and 1120. Although illustrated as discrete blocks, various blocks of process 1100 may be divided into additional blocks, combined into fewer blocks, or eliminated, depending on the desired implementation. Moreover, the blocks/sub-blocks of process 1100 may be executed in the order shown in FIG. 11 or, alternatively in a different order. Furthermore, one or more of the blocks/sub-blocks of process 1100 may be executed repeatedly or iteratively. Process 1100 may be implemented by or in apparatus 910 and apparatus 920 as well as any variations thereof. Solely for illustrative purposes and without limiting the scope, process 1100 is described below in the context of apparatus 910 as communication entity 110 (e.g., a transmitting device whether a STA or an AP) and apparatus 920 as communication entity 120 (e.g., a receiving device whether a STA or an AP) of a wireless network such as a WLAN in accordance with one or more of IEEE 802.11 standards. Process 1100 may begin at block 1110.

At 1110, process 1100 may involve signaling between a first STA (e.g., apparatus 910 implemented in communication entity 110 as a non-AP STA) and a second STA (e.g., apparatus 920 implemented in communication entity 120 as an AP) an EHT PPDU indicating a RU allocation with respect to multiple users. For instance, processor 912 of apparatus 910 may receive, via transceiver 916, the EHT PPDU from apparatus 920. Process 1100 may proceed from 1110 to 1120.

At 1120, process 1100 may involve determining one or more RU allocated to the first STA or the second STA as indicated in the EHT PPDU, with a number of one or more user fields in the EHT PPDU being less than a number of a plurality of RU allocation subfields in the EHT PPDU in an event that at least one of the plurality of RU allocation subfields corresponds to an empty RU not assigned to any user. For instance, processor 912 may determine which one or more RUs has/have been allocated to apparatus 910 as indicated in the received EHT PPDU.

In some implementations, in determining the one or more RU allocated, process 1100 may involve determining the one or more RU allocated by using a RU allocation table. The RU allocation table may include, in addition to entries corresponding to RUs allocatable to the plurality of users, one or more empty RU entries corresponding to one or more of an empty 242-tone RU, an empty 484-tone RU and an empty 996-tone RU.

In some implementations, there may be zero user allocated on each of the empty 242-tone RU, the empty 484-tone RU and the empty 996-tone RU.

In some implementations, the EHT PPDU may indicate a respective RU allocation for each of one or more frequency segments. In such cases, for at least one of the one or more frequency segments, a respective EHT-SIG may contain at least a first RU allocation subfield and a second RU allocation subfield for at least one of a plurality of content channels in the at least one of the one or more frequency segments. Additionally, the first RU allocation subfield may be filled with a non-empty entry from the RU allocation table indicating that there is a user on one or more RUs corresponding to the non-empty entry. Moreover, the second RU allocation subfield may be filled with one of the one or more empty RU entries indicating that there is no user on one or more RUs corresponding to the one of the one or more empty RU entries.

In some implementations, for the at least one of the one or more frequency segments, the respective EHT-SIG may further contain a user field corresponding to the first RU allocation subfield and no user field corresponding to the second RU allocation subfield.

In some implementations, the one or more frequency segments may include one or more 80 MHz frequency segments in an 80 MHz, 160 MHz or 320 MHz bandwidth utilized in communications between the first STA and the second STA in an EHT WLAN.

In some implementations, the EHT PPDU may indicate a respective RU allocation for each of one or more 80 MHz frequency segments. In such cases, in each of the one or more 80 MHz frequency segments, each of one or more respective EHT-SIGs may contain one or more respective RU allocations of RUs in the respective frequency segment that are allocated to one or more users of the plurality of users parked in the respective frequency segment.

In some implementations, in signaling, process 1100 may involve signaling for MU-MIMO. In such cases, the EHT PPDU may indicate an allocation of a RU of a size greater than 242 tones over more than one content channel including a first content channel and a second content channel. For instance, a first 8-bit RU allocation subfield corresponding to the first content channel may indicate a first number of users to which a corresponding first number of RUs are allocated. Moreover, the EHT PPDU may contain a first number of user fields corresponding to the first number of users for the first content channel. Similarly, a second 8-bit RU allocation subfield corresponding to the second content channel may indicate a second number of users to which a corresponding second number of RUs are allocated. Furthermore, the EHT PPDU may contain a second number of user fields corresponding to the second number of users for the second content channel.

In some implementations, in signaling, process 1100 may involve signaling for MU-MIMO. In such cases, the EHT PPDU may indicate a MU-MIMO allocation of one or more RUs to one or more users of the plurality of users. Additionally, the EHT PPDU may contain one or more user fields each corresponding to a respective one of the one or more users. Moreover, each of the one or more user fields may contain a spatial configuration subfield that includes: (a) 6 bits indicating a spatial stream configuration for a respective user among the one or more users in the MU-MIMO allocation and 3 bits indicating a position of the respective user, or (b) 4 bits indicating a starting spatial index of the respective user and 2 bits indicating a number of spatial streams assigned to the respective user.

In some implementations, in signaling, process 1100 may involve signaling for MU-MIMO. In such cases, for a respective frequency segment of one or more frequency segments, an EHT-SIG in the EHT PPDU may contain one or more user fields corresponding to one or more users of the plurality of users to which one or more respective RUs are allocated in the respective frequency segment. In such cases, a number of the one or more user fields in the EHT-SIG for the respective frequency segment is equal to a number of the one or more users to which the one or more respective RUs are allocated in the respective frequency segment.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    signaling between a first station (STA) and a second STA an extreme-high-throughput (EHT) physical-layer protocol data unit (PPDU) indicating a resource unit (RU) allocation with respect to multiple users; and
    determining one or more RU allocated to the first STA or the second STA as indicated in the EHT PPDU by using a RU allocation table comprising, in addition to entries corresponding to RUs allocatable to a plurality of users, one or more empty RU entries corresponding to one or more of an empty 242-tone RU, an empty 484-tone RU and an empty 996-tone RU.

2. The method of claim 1, wherein there is zero user allocated on each of the empty 242-tone RU, the empty 484-tone RU and the empty 996-tone RU.

3. The method of claim 2, wherein the RU allocation table further comprises an empty RU entry corresponding to an empty 2×996-tone RU, and wherein there is zero user allocated on the empty 2×996-tone RU.

4. The method of claim 1, wherein the EHT PPDU indicates a respective RU allocation for each of one or more frequency segments, wherein, for at least one of the one or more frequency segments, a respective EHT signal field (EHT-SIG) contains at least a first RU allocation subfield and a second RU allocation subfield for at least one of a plurality of content channels in the at least one of the one or more frequency segments, wherein the first RU allocation subfield is filled with a non-empty entry from the RU allocation table indicating that there is a user on one or more RUs corresponding to the non-empty entry, and wherein the second RU allocation subfield is filled with one of the one or more empty RU entries indicating that there is no user on one or more RUs corresponding to the one of the one or more empty RU entries.

5. The method of claim 4, wherein, for the at least one of the one or more frequency segments, the respective EHT-SIG further contains a user field corresponding to the first RU allocation subfield and no user field corresponding to the second RU allocation subfield.

6. The method of claim 4, wherein the one or more frequency segments comprise one or more 80 MHz frequency segments in an 80 MHz, 160 MHz or 320 MHz bandwidth utilized in communications between the first STA and the second STA in an EHT wireless local area network (WLAN).

7. The method of claim 1, wherein the EHT PPDU indicates a respective RU allocation for each of one or more 80 MHz frequency segments, wherein, in each of the one or more 80 MHz frequency segments, each of one or more respective EHT signal fields (EHT-SIGs) contains one or more respective RU allocations of RUs in the respective frequency segment that are allocated to one or more users of the plurality of users parked in the respective frequency segment.

8. The method of claim 1, wherein the signaling comprises signaling for multi-user multiple-input-multiple-output (MU-MIMO), wherein the EHT PPDU indicates an allocation of a RU of a size greater than 242 tones over more than one content channel including a first content channel and a second content channel, wherein a first 8-bit RU allocation subfield corresponding to the first content channel indicates a first number of users to which a corresponding first number of RUs are allocated, wherein the EHT PPDU contains a first number of user fields corresponding to the first number of users for the first content channel, wherein a second 8-bit RU allocation subfield corresponding to the second content channel indicates a second number of users to which a corresponding second number of RUs are allocated, wherein the EHT PPDU contains a second number of user fields corresponding to the second number of users for the second content channel.

9. The method of claim 1, wherein the signaling comprises signaling for multi-user multiple-input-multiple-output (MU-MIMO), wherein the EHT PPDU indicates a MU-MIMO allocation of one or more RUs to one or more users of the plurality of users, wherein the EHT PPDU contains one or more user fields each corresponding to a respective one of the one or more users, and wherein each of the one or more user fields contains a spatial configuration subfield comprising:
- 6 bits indicating a spatial stream configuration for a respective user among the one or more users in the MU-MIMO allocation and 3 bits indicating a position of the respective user, or
- 4 bits indicating a starting spatial index of the respective user and 2 bits indicating a number of spatial streams assigned to the respective user.

10. The method of claim 1, wherein the signaling comprises signaling for multi-user multiple-input-multiple-output (MU-MIMO), wherein, for a respective frequency segment of one or more frequency segments, an EHT signal field (EHT-SIG) in the EHT PPDU contains one or more user fields corresponding to one or more users of the plurality of users to which one or more respective RUs are allocated in the respective frequency segment, and wherein a number of the one or more user fields in the EHT-SIG for the respective frequency segment is equal to a number of the one or more users to which the one or more respective RUs are allocated in the respective frequency segment.

11. The method of claim 1, wherein, in an event that an RU or a multi-RU (MRU) is referred to by two or more RU allocation subfields of the plurality of RU allocation subfields in an EHT signal field (EHT-SIG) content channel, one of the two or more RU allocation subfields other than a first one of the two or more RU allocation subfields in the EHT-SIG content channel encodes one or more empty additional user fields per RU contributed to a user specific field in a same EHT-SIG content channel as the one of the two or more RU allocation subfields.

12. An apparatus, comprising:
a transceiver configured to communicate wirelessly; and
a processor coupled to the transceiver and configured to perform operations comprising:
    signaling, via the transceiver, between a first station (STA) and a second STA an extreme-high-throughput (EHT) physical-layer protocol data unit (PPDU) indicating a resource unit (RU) allocation with respect to a plurality of users; and
    determining one or more RU allocated to the first STA or the second STA as indicated in the EHT PPDU,
wherein a number of one or more user fields in the EHT PPDU is less than a number of a plurality of RU allocation subfields in the EHT PPDU in an event that at least one of the plurality of RU allocation subfields corresponds to an empty RU not assigned to any user.

13. The apparatus of claim 12, wherein the determining of the one or more RU allocated comprises determining the one or more RU allocated by using a RU allocation table comprising, in addition to entries corresponding to RUs allocatable to the plurality of users, one or more empty RU entries corresponding to one or more of an empty 242-tone RU, an empty 484-tone RU and an empty 996-tone RU, and wherein there is zero user allocated on each of the empty 242-tone RU, the empty 484-tone RU and the empty 996-tone RU.

14. The apparatus of claim 12, wherein the EHT PPDU indicates a respective RU allocation for each of one or more frequency segments, wherein, for at least one of the one or more frequency segments, a respective EHT signal field (EHT-SIG) contains the plurality of RU allocation subfields comprising at least a first RU allocation subfield and a second RU allocation subfield for at least one of a plurality of content channels in the at least one of the one or more frequency segments, wherein the first RU allocation subfield is filled with a non-empty entry from the RU allocation table indicating that there is a user on one or more RUs corresponding to the non-empty entry, and wherein the second RU allocation subfield is filled with one of the one or more empty RU entries indicating that there is no user on one or more RUs corresponding to the one of the one or more empty RU entries.

15. The apparatus of claim 14, wherein, for the at least one of the one or more frequency segments, the respective EHT-SIG further contains a user field corresponding to the first RU allocation subfield and no user field corresponding to the second RU allocation subfield.

16. The apparatus of claim 14, wherein the one or more frequency segments comprise one or more 80 MHz frequency segments in an 80 MHz, 160 MHz or 320 MHz bandwidth utilized in communications between the first STA and the second STA in an EHT wireless local area network (WLAN).

17. The apparatus of claim 12, wherein the EHT PPDU indicates a respective RU allocation for each of one or more 80 MHz frequency segments, wherein, in each of the one or more 80 MHz frequency segments, each of one or more respective EHT signal fields (EHT-SIGs) contains one or more respective RU allocations of RUs in the respective frequency segment that are allocated to one or more users of the plurality of users parked in the respective frequency segment.

18. The apparatus of claim 12, wherein, in signaling, the processor is configured to signal for multi-user multiple-input-multiple-output (MU-MIMO), wherein the EHT PPDU indicates an allocation of a RU of a size greater than 242 tones over more than one content channel including a first content channel and a second content channel, wherein a first 8-bit RU allocation subfield corresponding to the first content channel indicates a first number of users to which a corresponding first number of RUs are allocated, wherein the EHT PPDU contains a first number of user fields corresponding to the first number of users for the first content channel, wherein a second 8-bit RU allocation subfield corresponding to the second content channel indicates a second number of users to which a corresponding second number of RUs are allocated, wherein the EHT PPDU contains a second number of user fields corresponding to the second number of users for the second content channel.

19. The apparatus of claim 12, wherein, in signaling, the processor is configured to signal for multi-user multiple-input-multiple-output (MU-MIMO), wherein the EHT PPDU indicates a MU-MIMO allocation of one or more RUs to one or more users of the plurality of users, wherein the EHT PPDU contains one or more user fields each corresponding to a respective one of the one or more users, and wherein each of the one or more user fields contains a spatial configuration subfield comprising:
- 6 bits indicating a spatial stream configuration for a respective user among the one or more users in the MU-MIMO allocation and 3 bits indicating a position of the respective user, or
- 4 bits indicating a starting spatial index of the respective user and 2 bits indicating a number of spatial streams assigned to the respective user.

20. The apparatus of claim 12, wherein, in signaling, the processor is configured to signal for multi-user multiple-input-multiple-output (MU-MIMO), wherein, for a respective frequency segment of one or more frequency segments, an EHT signal field (EHT-SIG) in the EHT PPDU contains one or more user fields corresponding to one or more users of the plurality of users to which one or more respective RUs are allocated in the respective frequency segment, and wherein a number of the one or more user fields in the EHT-SIG for the respective frequency segment is equal to a number of the one or more users to which the one or more respective RUs are allocated in the respective frequency segment.

\* \* \* \* \*